(12) United States Patent
Greminger et al.

(10) Patent No.: US 8,400,736 B2
(45) Date of Patent: Mar. 19, 2013

(54) SLIDER TOP BOND DESIGN WITH SHORTED PAD CONFIGURATION

(75) Inventors: Michael Allen Greminger, St. Anthony, MN (US); Jon Karsten Klarqvist, Roseville, MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 644 days.

(21) Appl. No.: 12/509,946

(22) Filed: Jul. 27, 2009

(65) Prior Publication Data

US 2011/0019311 A1 Jan. 27, 2011

(51) Int. Cl.
*G11B 21/21* (2006.01)
*G11B 5/60* (2006.01)
(52) U.S. Cl. .................................... 360/234.5
(58) Field of Classification Search ............... 360/234.5, 360/323
See application file for complete search history.

(56) References Cited

U.S. PATENT DOCUMENTS

| | | | |
|---|---|---|---|
| 4,648,087 A * | 3/1987 | Scranton et al. ........... | 360/234.5 |
| 4,761,699 A | 8/1988 | Ainslie et al. | |
| 4,789,914 A | 12/1988 | Ainslie et al. | |
| 5,638,237 A * | 6/1997 | Phipps et al. ............... | 360/323 |
| 5,680,275 A | 10/1997 | Frater et al. | |
| 5,717,547 A | 2/1998 | Young | |
| 5,737,152 A | 4/1998 | Balakrishnan | |
| 5,781,379 A | 7/1998 | Erpelding et al. | |
| 5,896,248 A | 4/1999 | Hanrahan et al. | |
| 5,914,834 A | 6/1999 | Gustafson | |
| 5,982,583 A | 11/1999 | Strom | |
| 5,995,328 A | 11/1999 | Balakrishnan | |
| 6,038,102 A | 3/2000 | Balakrishnan et al. | |
| 6,078,473 A | 6/2000 | Crane et al. | |
| 6,233,177 B1 | 5/2001 | Shokouhi et al. | |
| 6,351,353 B1 | 2/2002 | Sluzewski et al. | |
| 6,430,047 B2 | 8/2002 | Wentzel et al. | |
| 6,747,845 B1 | 6/2004 | Baglin et al. | |
| 6,940,697 B2 | 9/2005 | Jang et al. | |
| 6,985,332 B1 | 1/2006 | Sluzewski et al. | |
| 2006/0274452 A1 | 12/2006 | Arya | |
| 2007/0111645 A1 | 5/2007 | Hu et al. | |
| 2007/0274005 A1 | 11/2007 | Zhu et al. | |

FOREIGN PATENT DOCUMENTS

| | | | |
|---|---|---|---|
| JP | 10124837 A | 5/1998 | |
| JP | 2000173035 A | 6/2000 | |
| JP | 2002289992 A | 10/2002 | |
| JP | 2003036513 A | 2/2003 | |

(Continued)

OTHER PUBLICATIONS

English-language abstract JP10124837 (Quantum Corp), May 15, 1998.

(Continued)

*Primary Examiner* — Craig A. Renner
(74) *Attorney, Agent, or Firm* — Fredrikson & Byron, P.A.

(57) ABSTRACT

An assembly includes a slider having an air bearing surface and a slider mounting surface opposite the air bearing surface. The slider mounting surface includes first, second, third, and fourth slider pads. A first slider trace electrically shorts the first slider pad with the third slider pad. A second slider trace electrically shorts the second slider pad with the fourth slider pad. A transducing head is supported by the slider. The transducing head includes a positive terminal electrically connected to the first slider pad and a negative terminal electrically connected to the second slider pad. The first, second, third, and fourth slider pads can be connected to pads on a connection circuit with interleaved traces.

18 Claims, 6 Drawing Sheets

FOREIGN PATENT DOCUMENTS

| | | |
|---|---|---|
| JP | 2010135754 A | 6/2010 |
| JP | 2010160853 A | 7/2010 |
| JP | 2010267334 A | 11/2010 |
| JP | 2011040516 A | 2/2011 |

OTHER PUBLICATIONS

English-language abstract JP2000173035 (Toshiba Corp), Jun. 23, 2000.

English-language abstract JP2002289992 Toshiba Corp), Oct. 4, 2002.

English-language abstract JP2003036513 (Matsushita Electric Ind), Feb. 7, 2003.

English-language abstract JP2010135754 (Nitto Denko Corp), Jun. 17, 2010.

English-language abstract JP2010160853 (Nitto Denko Corp), Jul. 22, 2010.

English-language abstract JP2010267334 (NHK Spring Co Ltd), Nov. 25, 2010.

English-language abstract JP2011040516 (Sumitomo Elec Printed Circuits), Feb. 24, 2011.

* cited by examiner

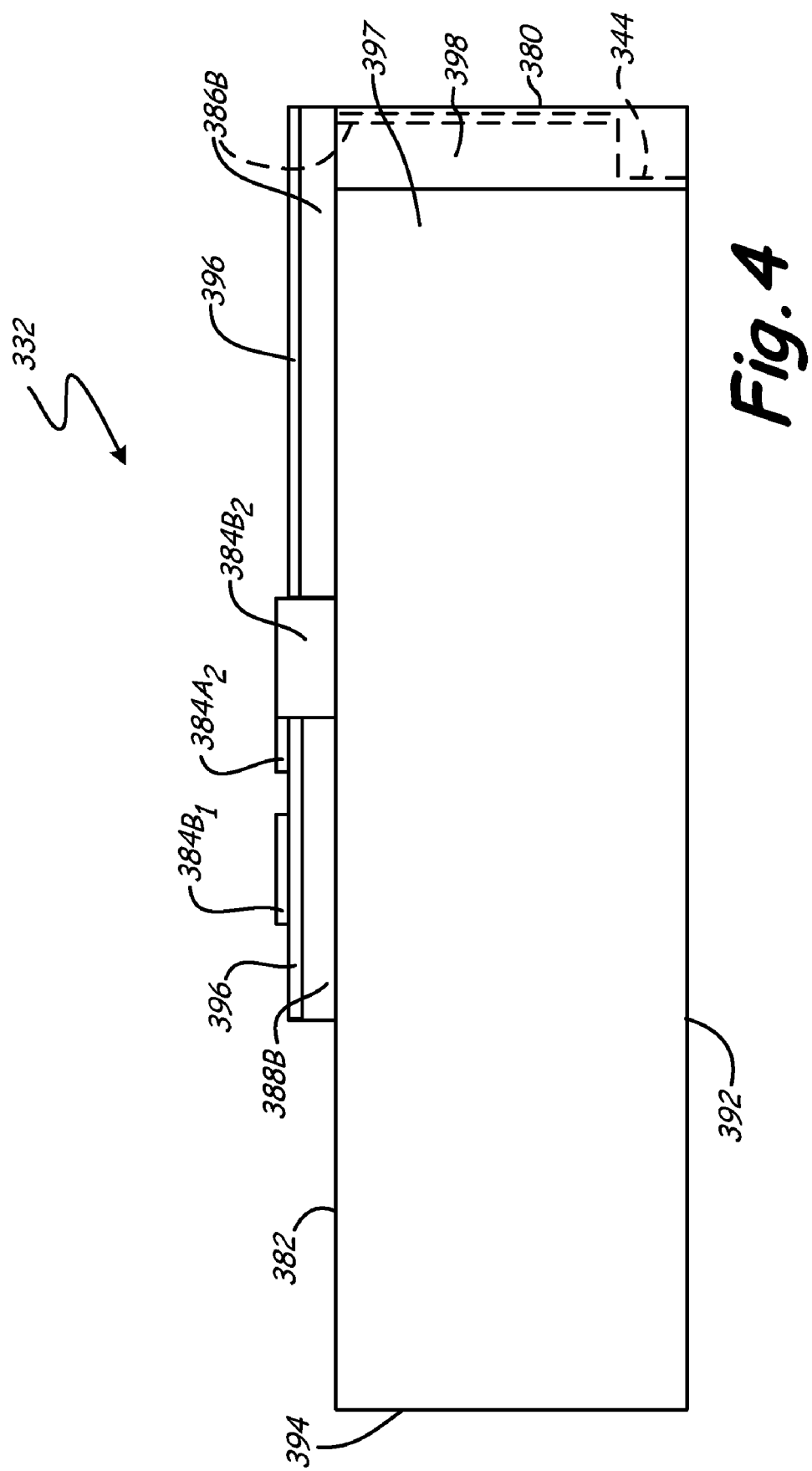

SLIDER TOP BOND DESIGN WITH SHORTED PAD CONFIGURATION

BACKGROUND

The present invention relates to transducing heads for use with magnetic recording media systems, and more particularly, to electrical connections to a slider.

Hard disc drives (HDDs) typically comprise one or more discs, each disc having concentric data tracks for storing data. Where multiple discs are used, a stack is formed of co-axial discs having generally the same diameter. A transducing head carried by a slider is used to read from and write to a data track on a disc. The slider is carried by a head arm assembly that includes an actuator arm and a suspension assembly, which can include a separate gimbal structure or can integrally form a gimbal. As the disc is spun, the slider glides above the surface of the disc on a small cushion of air. The actuator arm movably positions the slider with respect to the disc. Electrical connections extend along the suspension to electrically connect the transducing head to components located at or near the actuator arm. Those electrical connections can be formed on the suspension itself, or can be located on a separate interconnect structure supported relative to the suspension, such as a flex-on suspension (FOS). Electrical connections on a FOS are typically called traces. Typically, a single trace is used for each electrical connection, such as positive and negative writer traces, positive and negative reader traces, a heater trace, a ground trace, and others.

SUMMARY

According to the present invention, an assembly includes a slider having an air bearing surface and a slider mounting surface opposite the air bearing surface. The slider mounting surface includes first, second, third, and fourth slider pads. A first slider trace electrically shorts the first slider pad with the third slider pad. A second slider trace electrically shorts the second slider pad with the fourth slider pad. A transducing head is supported by the slider. The transducing head includes a positive terminal electrically connected to the first slider pad and a negative terminal electrically connected to the second slider pad.

In another embodiment, an assembly includes a slider with a slider mounting surface and a connection circuit with a circuit surface. First, second, third, and fourth slider pads are on the slider mounting surface, wherein the first slider pad is shorted with the third slider pad by a first slider trace and the second slider pad is shorted with the fourth slider pad by a second slider trace. First, second, third, and fourth connection circuit pads are on the circuit surface, and each are electrically connected to the first, second, third, and fourth slider pads, respectively. The circuit surface also has first, second, third, and fourth connection circuit traces, each connected to the first, second, third, and fourth connection circuit pads, respectively. The first, second, third, and fourth connection circuit traces are interleaved on the circuit surface such that the first connection circuit trace is adjacent to the second connection circuit trace, the second connection circuit trace is adjacent to the third connection circuit trace, and the third connection circuit trace is adjacent to the fourth connection circuit trace.

BRIEF DESCRIPTION OF THE DRAWINGS

FIG. 4 is a side elevation view of a slider according to the present invention.

DETAILED DESCRIPTION

In general, the present invention provides a connection circuit for electrically connecting a pre-amp of a hard disc drive (HDD) to a slider. At least two paths from the pre-amp are each split from single paths into split paths and interleaved together. The circuit includes a flex-on suspension (FOS), or flex circuit, including a section of interleaved traces, all on a single layer without jumpers or vias in the interleaved section. The slider has a slider mounting surface with mounting pads to connect to the interleaved traces and with mounting surface traces to reconnect the split paths into single paths. This interleaved configuration creates a benefit of reducing the electrical impedance of the circuit. However, additional connections are needed to split and reconnect each electrical connection without shorting with the other interleaved traces. Prior art FOSs typically use jumpers or vias to make these connections. Adding jumpers and vias can add increased manufacturing costs of a FOS. By connecting interleaved traces on the slider mounting surface with traces, interleaving can be achieved on the FOS without using expensive jumpers or vias that take up additional space.

Figure 1:
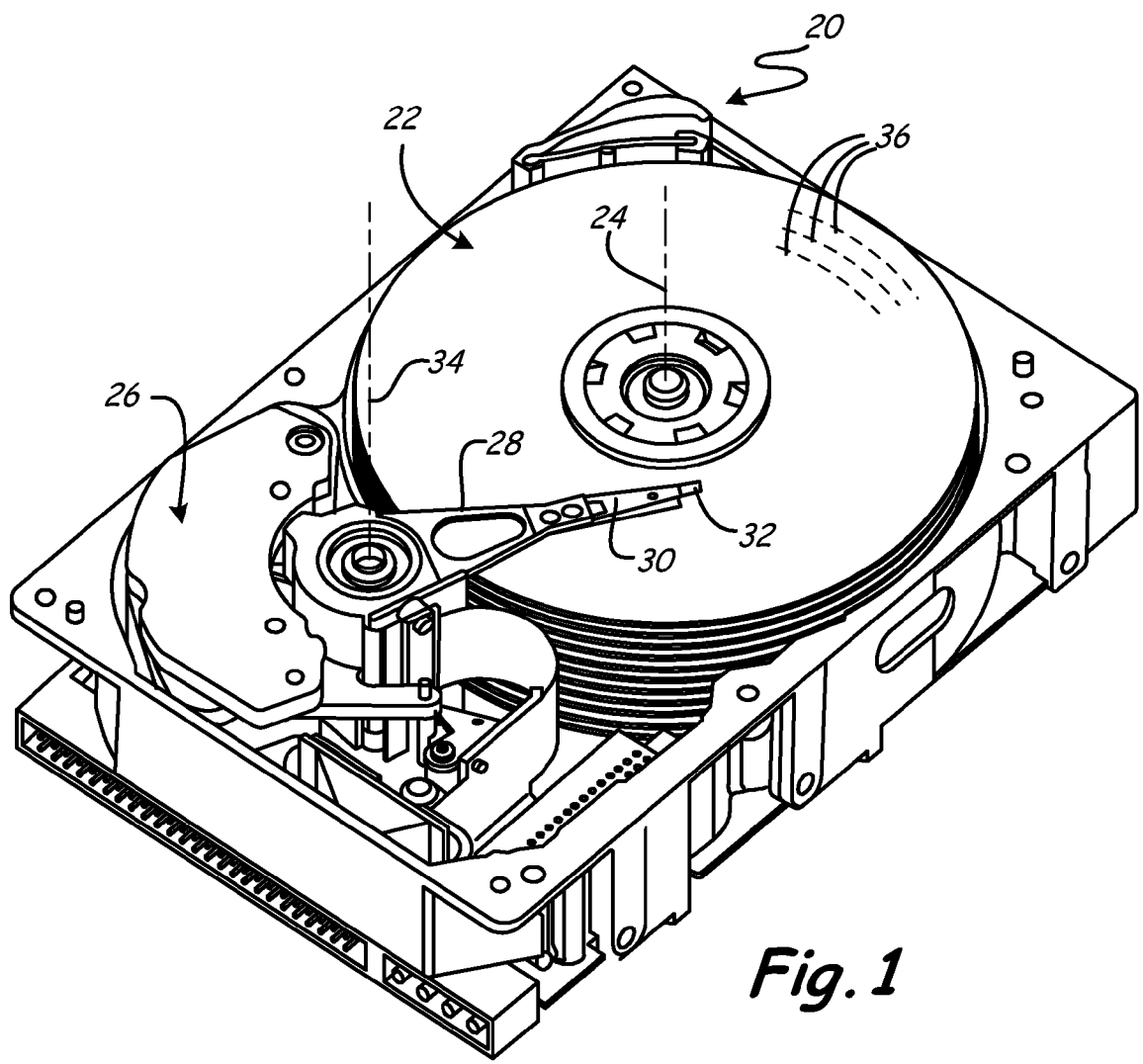
FIG. 1 is a perspective view of a hard disc drive system.

FIG. 1 is a perspective view of an exemplary HDD system 20 that includes magnetic storage disc 22 configured to rotate about axis 24, actuation motor 26 (e.g., a voice coil motor), actuator arm 28, suspension assembly 30, and slider 32 carrying a transducing head. Slider 32 is supported by suspension assembly 30, which in turn is supported by actuator arm 28. Actuation motor 26 is configured to pivot actuator arm 28 about axis 34, in order to sweep suspension 30 and slider 32 in an arc across a surface of rotating disc 22 with slider 32 "flying" above disc 22 on a cushion or air. An additional microactuation system can be provided for producing precise, small-scale movements of suspension 30 and slider 32. The transducing head carried by slider 32 can be positioned relative to selected concentric data tracks 36 of disc 22, for reading from and writing to disc 22. It should be noted that a stack of co-rotating discs 22 can be provided, with additional actuator arms 28, suspension assemblies 30, and sliders 32 carrying transducing heads for reading and writing at top and bottom surfaces of each disc 22 in the stack.

Figure 2:
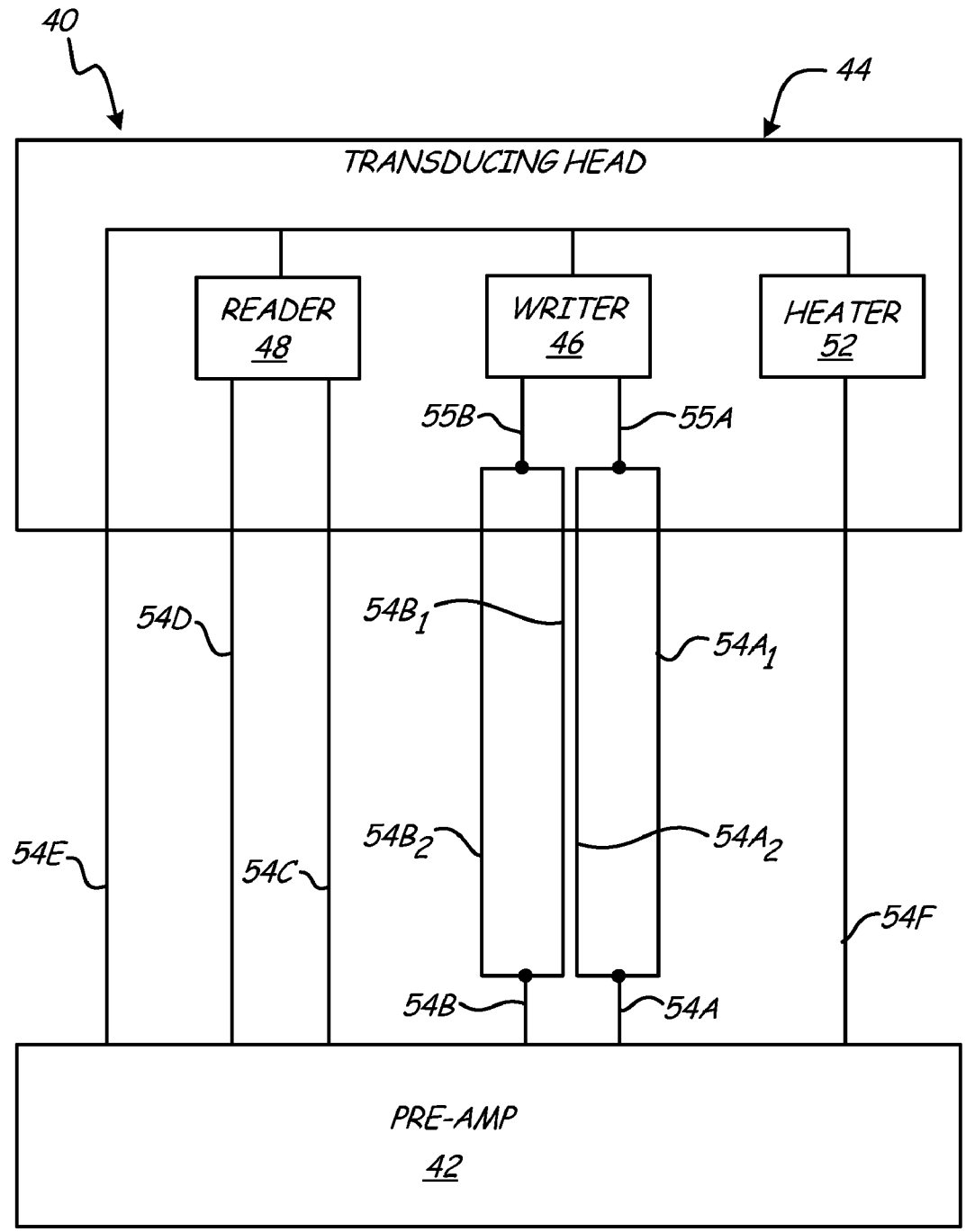
FIG. 2 is a schematic electrical diagram of a circuit assembly according to the present invention.

FIG. 2 is a schematic electrical diagram of circuit assembly 40 according to the present invention. Circuit assembly 40 includes pre-amp 42 and transducing head 44, which includes writer 46, reader 48, and heater 52. Pre-amp 42 is electrically connected to writer 46 through writer minus (W−) main path 54A and writer plus (W+) main path 54B. Paths that are labeled with a "−" symbol and a "+" symbol herein are negative and positive electrical connections, respectively. W− main path 54A splits into two W− split paths $54A_1$ and $54A_2$ then recombines into a single W− main path 55A. W+ main path 54B splits into two W+ split paths $54B_1$ and $54B_2$ then recombines into a single W+ main path 55B. W− main path 54A and W+ main path 54B are split in order to lower an electrical impedance of each path as will be explained further below. It should be noted that FIG. 2 is merely schematic and that interleaving of W− split paths $54A_1$ and $54A_2$ with W+ split paths $54B_1$ and $54B_2$ is not shown in FIG. 2 for simplicity. Interleaving is illustrated in FIGS. 3A, 3B, and 3C, as explained below.

Pre-amp 42 is electrically connected to reader 48 through reader minus (R−) path 54C and reader plus (R+) path 54D. Pre-amp 42 is electrically connected to heater 52 through heater path 54F. Pre-amp 42 is also connected to transducing head 44 through ground path 54E to provide an electrical ground for one or more components in transducing head 44. In the illustrated embodiment, ground path 54E is connected to each of writer 46, reader 48, and heater 52.

Transducing head 44 is carried on slider 32 (not shown in FIG. 2). Pre-amp 42 drives transducing head 44 to read from data tracks 36 using reader 48 and to write to data tracks 36 using writer 46. Pre-amp 42 drives heater 52 to heat writer 46 to a predetermined temperature. In other embodiments, pre-amp 42 can be electrically connected to additional components carried by slider 32 (not shown in FIG. 2).

Figure 3A:
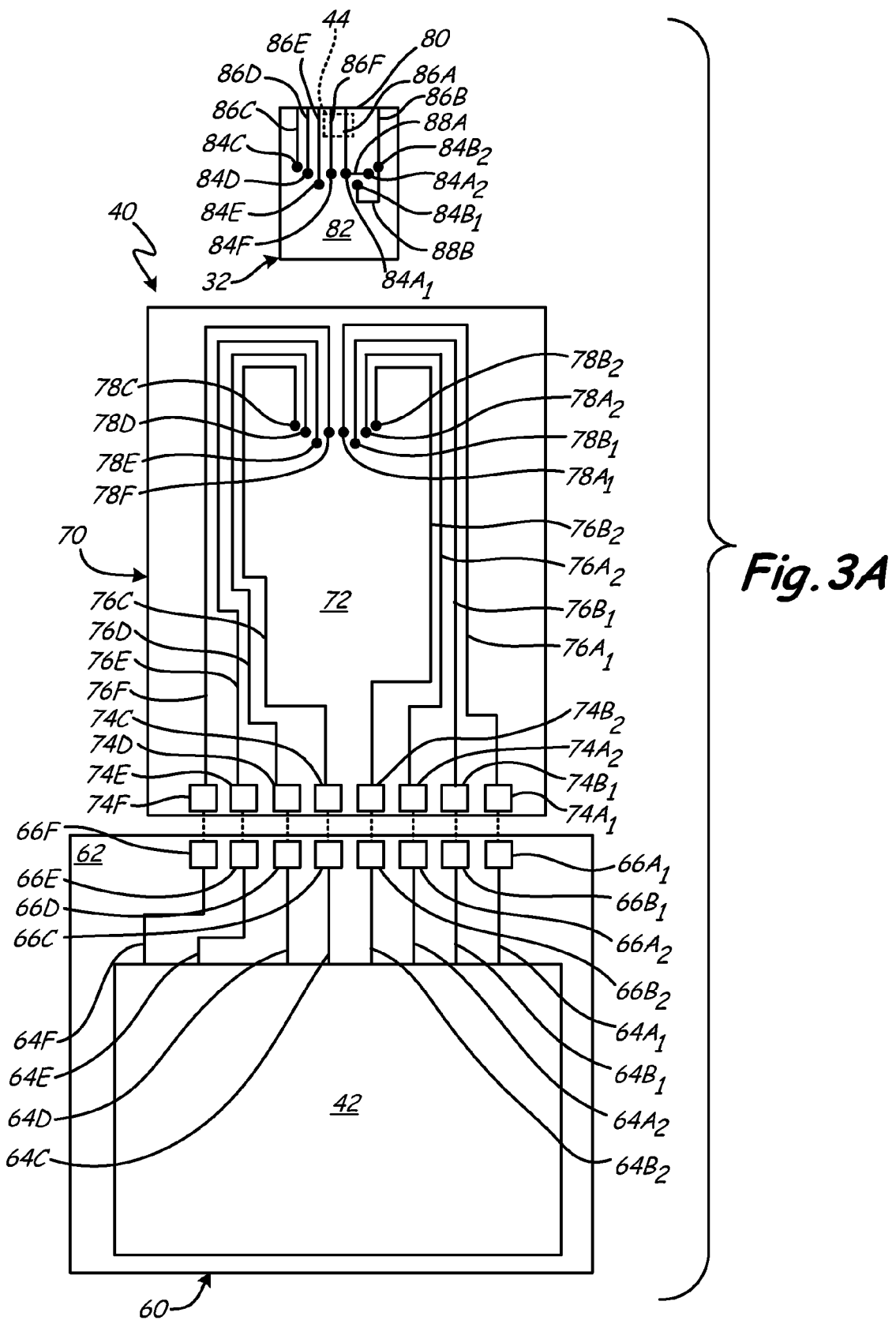
FIG. 3A is an exploded schematic view of a first embodiment of the circuit assembly.
Figure 3B:
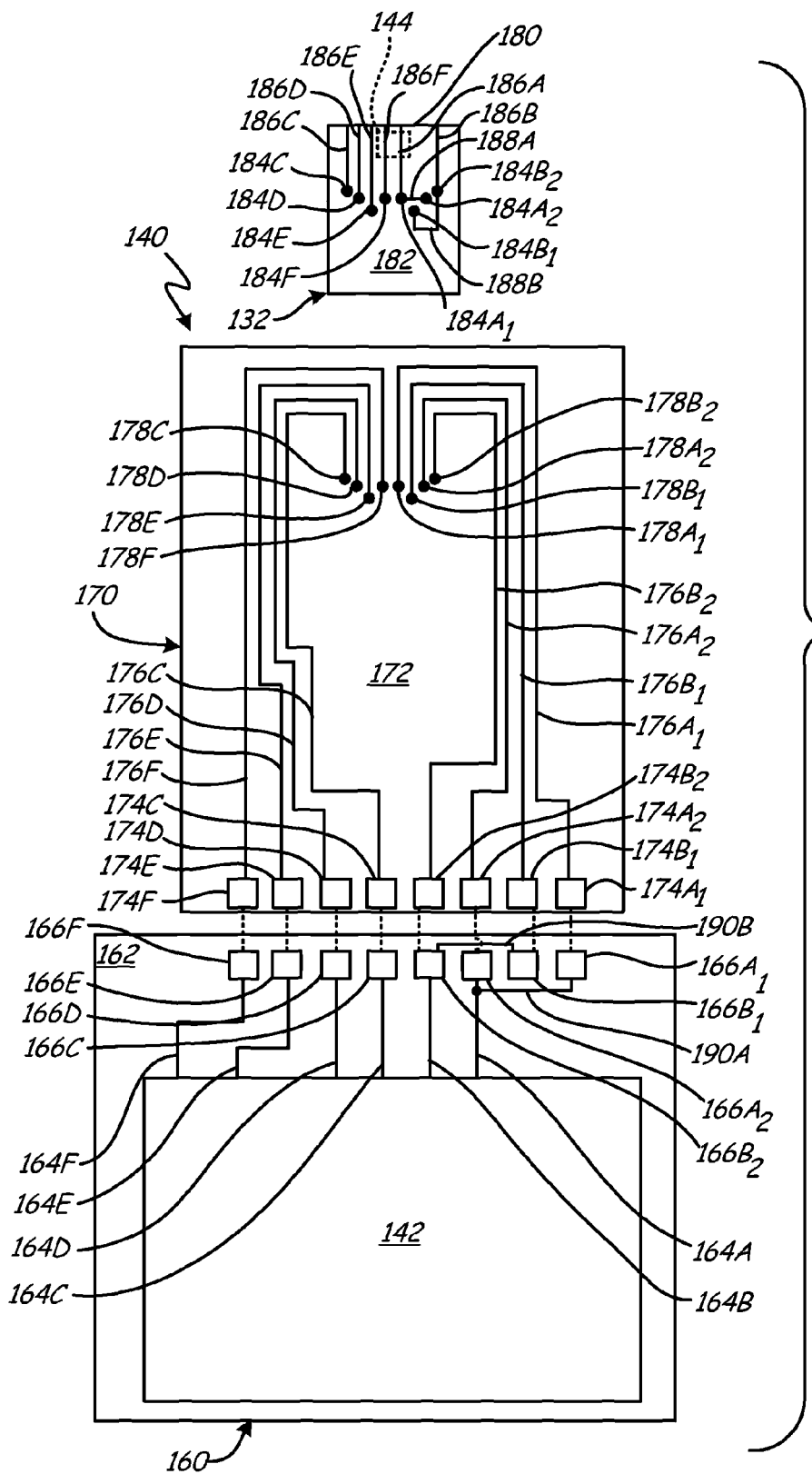
FIG. 3B is an exploded schematic view of a second embodiment of the circuit assembly.
Figure 3C:
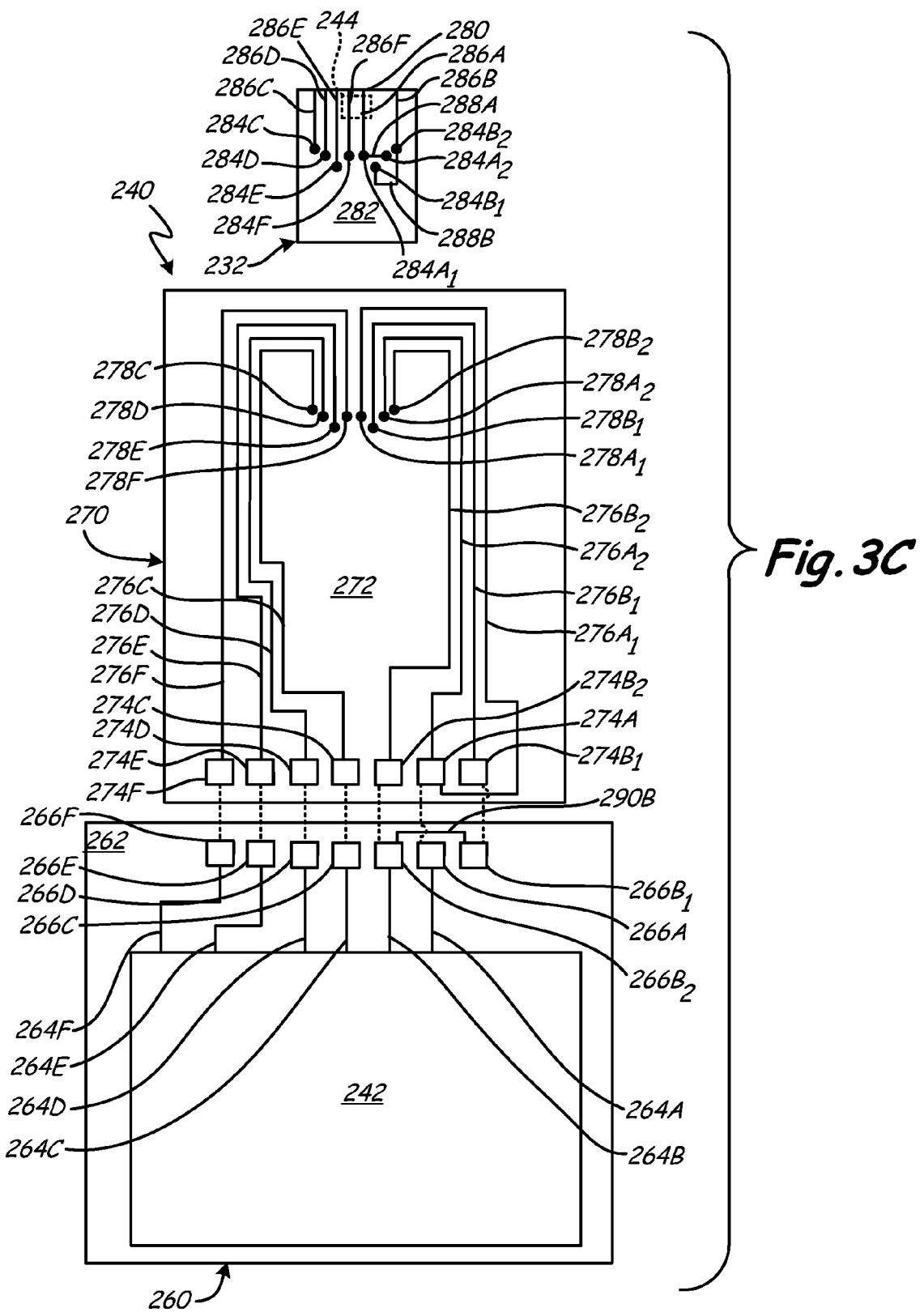
FIG. 3C is an exploded schematic view of a third embodiment of the circuit assembly.

FIG. 3A is a schematic view of a first embodiment of circuit assembly 40. Circuit assembly 40 includes printed circuit card assembly (PCCA) 60 (which includes PCCA surface 62, pre-amp 42, PCCA traces $64A_1$-64F, and PCCA pads $66A_1$-66F), flex circuit 70 (which includes circuit surface 72, circuit tail pads $74A_1$-74F, circuit traces $76A_1$-76F, and circuit head pads $78A_1$-78F), and slider 32 (which includes trailing edge 80, slider mounting surface 82, slider pads $84A_1$-84F, slider main traces 86A-86F, slider connecting traces 88A-88B, and transducing head 44).

PCCA 60 can include a variety of electrical components and traces mounted on PCCA surface 62. In the illustrated embodiment, pre-amp 42 and PCCA pads $66A_1$-66F are mounted on PCCA surface 62. PCCA traces $64A_1$-64F are also on PCCA surface 62, electrically connecting pre-amp 42 to each PCCA pad $66A_1$-66F, respectively.

Flex circuit 70 includes a relatively flat, thin, and flexible circuit surface 72 made of an electrically insulative material, such as a suitable polyimide material, for supporting electrical traces. Circuit tail pads $74A_1$-74F, circuit traces $76A_1$-76F, and circuit head pads $78A_1$-78F are all supported by circuit surface 72. Circuit traces $76A_1$-76F connect each of circuit tail pads $74A_1$-74F to circuit head pads $78A_1$-78F, respectively. In the illustrated embodiment, circuit traces $76A_1$-76F are electrically isolated from each other and can be surrounded by the insulative material of circuit surface 72. Circuit tail pads $74A_1$-74F are mounted on circuit surface 72 in approximately the same orientation as PCCA pads $66A_1$-66F are mounted on PCCA surface 62. Circuit tail pads $74A_1$-74F can be placed adjacent to and electrically connected to each of PCCA pads $66A_1$-66F, respectively. In one embodiment, circuit tail pads $74A_1$-74F are connected to PCCA pads $66A_1$-66F with solder.

Slider 32 includes slider mounting surface (or top surface) 82, which, supports slider pads $84A_1$-84F, slider main traces 86A-86F, and slider connecting traces 88A and 88B. Slider connecting trace 88A electrically connects slider pad $84A_1$ and slider pad $84A_2$. Slider main trace 86A electrically connects slider pad $84A_1$ to a W+ terminal of writer 46 on transducing head 44 through an interior layer (not shown in FIG. 3A). Slider connecting trace 88B electrically connects slider pad $84B_1$ to slider pad $84B_2$. Slider main trace 86B electrically connects slider pad $84B_2$ to a W− terminal of writer 46 on transducing head 44 through an interior layer (not shown in FIG. 3A). Slider main trace 86C electrically connects slider pad 84C to a R− terminal of reader 48 on transducing head 44 through an interior layer (not shown in FIG. 3A). Slider main trace 86D electrically connects slider pad 84D to a R+ terminal of reader 48 on transducing head 44 through an interior layer (not shown in FIG. 3A). Transducing head 44 is located near trailing edge 80 of slider 32. Slider main trace 86E electrically connects slider pad 84E to transducing head 44 through an interior layer (not shown in FIG. 3A). Slider main trace 86F electrically connects slider pad 84F to heater 52 (not shown on FIG. 3A) through an interior layer (not shown in FIG. 3A). (For a more detailed description of connections to a transducing head, see commonly assigned U.S. Pat. App. Ser. No. 2007/0274005 entitled "Top Bond Pad for Transducing Head Interconnect"). Slider pads $84A_1$-84F are mounted on slider mounting surface 82 in approximately the same orientation as circuit head pads $78A_1$-78F are mounted on flexible circuit surface 72. Slider pads $84A_1$-84F can be placed adjacent to and electrically connected to circuit head pads $78A_1$-78F, respectively. In one embodiment, slider pads $84A_1$-84F can be connected to circuit head pads $78A_1$-78F with solder in a known manner.

The function of the W− main path (including the W− split paths) is performed by a more complex set of traces and pads than single "straight" electrical connections of the prior art. In the embodiment illustrated in FIG. 3A, the W− main path is already split upon exiting pre-amp 42. Thus, the function of one W− split path is performed by PCCA trace $64A_1$, PCCA pad $66A_1$, circuit tail pad $74A_1$, circuit trace $76A_1$, circuit head pad $78A_1$, and slider pad $84A_1$. Similarly, the function of the other W− split path is performed by PCCA trace $64A_2$, PCCA pad $66A_2$, circuit tail pad $74A_2$, circuit trace $76A_2$, circuit head pad $78A_2$, and slider pad $84A_2$. The W− split paths are reconnected when slider connecting trace 88A connects slider pad $84A_1$ to slider pad $84A_2$. Slider main trace 86A performs the function of the W− main path by connecting slider pad $84A_1$ to transducing head 44, thus completing a W− connection between pre-amp 42 and writer 46.

The function of the W+ main path (including the W+ split paths) is also performed by a set of traces and pads in a similar fashion as for the W− main path. In the embodiment illustrated in FIG. 3A, the W+ main path is already split upon exiting pre-amp 42. Thus, the function of one W+ split path is performed by PCCA trace $64B_1$, PCCA pad $66B_1$, circuit tail pad $74B_1$, circuit trace $76B_1$, circuit head pad $78B_1$, and slider pad $84B_1$. Similarly, the function of the other W+ split path is performed by PCCA trace $64B_2$, PCCA pad $66B_2$, circuit tail pad $74B_2$, circuit trace $76B_2$, circuit head pad $78B_2$, and slider pad $84B_2$. The W+ split paths are reconnected when slider connecting trace 88B connects slider pad $84B_1$ to slider pad $84B_2$. Slider main trace 86B performs the function of the W+ main path by connecting slider pad $84B_2$ to transducing head 44, thus completing a W+ connection between pre-amp 42 and writer 46.

Circuit trace $76B_1$, which carries a W+ signal, is physically located between circuit traces $76A_1$ and $76A_2$, which both carry a W− signal. Circuit trace $76A_2$, which carries a W− signal, is physically located between circuit traces $76B_1$ and $76B_2$, which both carry a W+ signal. Thus, circuit traces $76A_1$ and $76A_2$ are said to be interleaved with $76B_1$ and $76B_2$, with a substantial portion of circuit trace $76A_1$ being adjacent to a substantial portion of circuit trace $76B_1$, the substantial portion of circuit trace $76B_1$ being adjacent to a substantial portion of $76A_2$, and the substantial portion of $76A_2$ being adjacent to a substantial portion of $76B_2$. When current moves through each trace, a magnetic field is created on nearby traces. Because current moves in opposite directions on positive and negative traces, this phenomenon reduces an overall electrical impedance on interleaved traces $76A_1$, $76A_2$, $76B_1$, and $76B_2$. Thus, the overall electrical impedance of electrical paths between pre-amp 42 and writer 46 can be relatively low, thus improving performance.

In alternative embodiments, other electrical paths between pre-amp 42 and a component on slider 32 can be split and interleaved. For example, the R− path could be split and interleaved with a similarly split R+ path to lower an electrical impedance of electrical paths between pre-amp 42 and reader 48.

FIG. 3B is a schematic view of a second embodiment of circuit assembly 140. Circuit assembly 140 as illustrated in FIG. 3B is similar to circuit assembly 40 as illustrated in FIG. 3A. Thus, similar to that already described for circuit assembly 40 of FIG. 3A, circuit assembly 140 of FIG. 3B, as shown, includes printed circuit card assembly (PCCA) 160 (which includes PCCA surface 162, pre-amp 142, PCCA traces 164A-164F, and PCCA pads $166A_1$-166F), flex circuit 170 (which includes circuit surface 172, circuit tail pads $174A_1$-174F, circuit traces $176A_1$-176F, and circuit head pads $178A_1$-178F), and slider 132 (which includes trailing edge 180, slider mounting surface 182, slider pads $184A_1$-184F, slider main traces 186A-186F, slider connecting traces 188A-188B, and transducing head 144). PCCA 160 is similar to PCCA 60 except for traces connecting pre-amp 142 to PCCA pads $166A_1$-$166B_2$ shown in FIG. 3B. PCCA trace 164A connects pre-amp 142 to PCCA pad $166A_2$, and PCCA trace 164B connects pre-amp 142 to PCCA pad $166B_2$. PCCA connection trace 190A connects PCCA trace 164A to PCCA pad $166A_1$, and PCCA connection trace 190B connects PCCA pad $166B_2$ to PCCA pad $166B_1$. Thus, the W+ main path and the W− main path split on PCCA surface 162 as opposed to inside of pre-amp 142. This configuration allows PCCA 160 to utilize a smaller quantity of effective electrical paths (PCCA traces 164A and 164B) than a quantity of pads (PCCA pads $166A_1$, $166B_1$, $166A_2$, and $166B_2$) to which the electrical paths are connected. Flex circuit 170 and slider 132 are identical to flex circuit 70 and slider 32 as illustrated in FIG. 3A.

An insulating layer (not shown in FIG. 3B) can be applied to traces on PCCA surface 162 or to traces on circuit surface 172 to prevent certain traces on each surface from creating an electrical short with an adjacent trace on the other surface when PCCA pads $166A_1$-166F are connected to circuit tail pads $174A_1$-174F.

FIG. 3C is a schematic view of a third embodiment of circuit assembly 240 according to the present invention. Circuit assembly 240 as illustrated in FIG. 3C is similar to circuit assembly 40 as illustrated in FIG. 3A. Thus, similar to that already described for circuit assembly 40 of FIG. 3A, circuit assembly 240 of FIG. 3C, as shown, includes printed circuit card assembly (PCCA) 260 (which includes PCCA surface 262, pre-amp 242, PCCA traces 264A-264F, and PCCA pads 266A-266F), flex circuit 270 (which includes circuit surface 272, circuit tail pads 274A-274F, circuit traces $276A_1$-276F, and circuit head pads $278A_1$-278F), and slider 232 (which includes trailing edge 280, slider mounting surface 282, slider pads $284A_1$-284F, slider main traces 286A-286F, slider connecting traces 288A-288B, and transducing head 244). PCCA 260 is similar to PCCA 60 except for traces connecting pre-amp 242 to PCCA pads 266A, $266B_1$, and $266B_2$ shown in FIG. 3C. PCCA trace 264A connects pre-amp 242 to PCCA pad 266A, and PCCA trace 264B connects pre-amp 242 to PCCA pad $266B_2$. PCCA connection trace 290B connects PCCA pad $266B_2$ to PCCA pad $266B_1$. Flex circuit 270 is similar to flex circuit 70 except for traces connecting to a single circuit tail pad 274A. Circuit trace $276A_1$ connects circuit tail pad 274A to circuit head pad $278A_1$, and circuit trace $276A_2$ connects circuit tail pad 274A to circuit head pad $278A_2$. Thus, the W+ main path splits on PCCA surface 262 and the W− main path splits on circuit surface 272, as opposed to inside of pre-amp 242. This configuration allows PCCA 260 to utilize a smaller quantity of effective electrical paths (PCCA traces 264A and 264B) than a quantity of pads (PCCA pads 266A, $266B_1$, and $266B_2$) to which the electrical paths are connected. Moreover, this configuration also allows PCCA 260 to utilize a smaller quantity of pads (PCCA pads 266A, $266B_1$, and $266B_2$) than used in the embodiments of FIGS. 3A and 3B. Slider 232 is identical to slider 32 as illustrated in FIG. 3A.

All of the pads and traces described above as illustrated by FIGS. 3A, 3B, and 3C can be created by etching conductive pathways from copper sheets laminated onto each of the respective surfaces (e.g. PCCA surface 62, circuit surface 72, and slider mounting surface 82). The method of etching traces and pads is known to those skilled in the art and therefore is not described in detail herein. Etching is a relatively inexpensive method of creating electrical connections that are relatively quick to manufacture in bulk. Jumpers and vias, on the other hand, are relatively expensive electrical connections that require additional steps in a manufacturing process. By splitting and reconnecting traces in a permanent manner on surfaces without vias and jumpers as in circuit assemblies 40, 140, and 240, electrical connections on a FOS can have the benefits of interleaving with a reduced manufacturing cost.

An insulating layer (not shown in FIGS. 3A, 3B, and 3C) can also be applied to traces on each of the respective surfaces (e.g. PCCA surface 62, circuit surface 72, and slider mounting surface 82) to prevent certain traces on each surface from creating an electrical short with an adjacent trace on the other surface.

FIG. 4 is a side elevation view of slider 332 according to the present invention. Slider 332 is identical to slider 32, slider 132, and slider 232 in all respects. In addition to those features described with reference to FIG. 3A, slider 332 further includes air bearing surface 392, leading edge 394, insulating layer 396, slider body 397, and overcoat 398. Air bearing surface 392 is aligned between leading edge 394 and trailing edge 380, opposite of slider mounting surface 382. Leading edge 394 is aligned between slider mounting surface 382 and air bearing surface 392, opposite of trailing edge 380.

Slider pads $384A_2$, $384B_1$, and $384B_2$ are shown positioned on slider mounting surface 382, each having a thickness raising them above slider mounting surface 382. Slider main trace 386B and slider connection trace 388B are shown mounted on slider mounting surface 382 with a thickness less than that of slider pads $384A_2$, $384B_1$, and $384B_2$. In alternative embodiments, each of slider main trace 386B, slider connection trace 388B, and slider pads $384A_2$, $384B_1$, and $384B_2$ can have a thickness making them flush with each other or flush with slider mounting surface 382. Insulating layer 396 is adjacent to each of slider main trace 386B and slider connection trace 388B on a side opposite of slider mounting surface 382. Insulating layer 396 leaves slider pads $384A_2$, $384B_1$, and $384B_2$ exposed. Insulating layer 396 protects against an electrical short between slider main trace 386B or slider connection trace 388B and one or more adjacent traces, such as traces on circuit surface 72.

Slider body 397 is a solid structure configured for mounting traces, pads, and overcoat layers. Overcoat 398 is a layer or series of layers of insulative material applied to slider body 397 at trailing edge 380. Slider main trace 386B is shown connecting slider pad $384B_2$ to transducing head 344 through overcoat 398. Transducing head is embedded in overcoat 398 near air bearing surface 392. The slider pads and traces visible in FIG. 4 obscure view of slider connection trace 388A, slider main traces 386A, 386C, 386D, 386E, and 386F, as well as slider pads $384A_1$, 384C, 384D, 384E, and 384F. Nonetheless, slider main traces 386A, 386C, 386D, 386E, and 386F can connect to transducing head 344 through overcoat 398 just like slider main trace 386B, as illustrated. In an alternative embodiment, slider 332 can have virtually any shape and orientation that includes slider mounting surface 382 supporting top bond pads and connection traces configured to reconnect interleaved traces, as described above.

It will be recognized that the present invention provides numerous benefits and advantages. For example, interleaving traces reduces electrical impedance between the pre-amp and the slider, thus improving performance. By reconnecting interleaved traces with connection traces on a surface of the slider, as opposed to using jumpers and vias, cost of manufacturing can be reduced. Also, because fabrication of a slider is already relatively complicated, creating electrical connections on a slider is a smaller marginal increase in complexity and cost than on a FOS. Further, by splitting interleaved traces on the surface of a FOS and a PCCA, as opposed to using jumpers and vias, less circuit space is used. Moreover, splitting interleaved traces on the surface of a FOS and a PCCA can also reduce the number of bond pad connections needed between a FOS and a PCCA.

Although the present invention has been described with reference to preferred embodiments, workers skilled in the art will recognize that changes may be made in form and detail without departing from the spirit and scope of the invention. For example, the number, path, and shape of various traces can be varied from those illustrated in the figures so long as portions of traces are interleaved as described above.

What is claimed is:

1. An assembly comprising:
   a slider comprising:
      an air bearing surface;
      a slider mounting surface opposite the air bearing surface;
      first, second, third, and fourth slider pads, all on the slider mounting surface;
      a first slider trace on the slider mounting surface electrically shorting in a permanent manner the first slider pad with the third slider pad;
      a second slider trace on the slider mounting surface electrically shorting in a permanent manner the second slider pad with the fourth slider pad; and
   a transducing head supported by the slider and comprising:
      a positive terminal electrically connected to the first slider pad; and
      a negative terminal electrically connected to the second slider pad.

2. The assembly of claim 1, and further comprising:
   a connection circuit comprising:
      first, second, third, and fourth connection circuit pads, each electrically connected to the first, second, third, and fourth slider pads, respectively;
      first, second, third, and fourth connection circuit traces, each connected to the first, second, third, and fourth connection circuit pads, respectively; and
      a circuit surface, on which the first and third connection circuit traces are interleaved with the second and fourth connection circuit traces.

3. The assembly of claim 2, wherein the first connection circuit trace is adjacent to the second connection circuit trace, the second connection circuit trace is adjacent to the third connection circuit trace, and the third connection circuit trace is adjacent to the fourth connection circuit trace.

4. The assembly of claim 2, wherein a substantial portion of each of the first, second, third, and fourth connection circuit traces are substantially parallel on the circuit surface.

5. The assembly of claim 4, wherein the first, second, third, and fourth connection circuit pads are located on the circuit surface.

6. The assembly of claim 2, wherein the first connection circuit trace is shorted with the third connection circuit trace at two locations and the second connection circuit trace is shorted with the fourth connection circuit trace at two locations.

7. The assembly of claim 1, wherein the first, second, third, and fourth slider pads are connected by solder to first, second, third, and fourth connection circuit pads, respectively.

8. The assembly of claim 1, wherein the first, second, third, and fourth slider pads are aligned substantially opposite of first, second, third, and fourth connection circuit pads, respectively.

9. The assembly of claim 1, wherein an insulating layer is adjacent to each of the first and second slider traces on a side opposite the slider.

10. An assembly comprising:
    a slider having a slider mounting surface comprising first, second, third, and fourth slider pads, wherein the first slider pad is shorted in a permanent manner with the third slider pad by a first slider trace and the second slider pad is shorted in permanent manner with the fourth slider pad by a second slider trace; and
    a connection circuit comprising:
       first, second, third, and fourth connection circuit pads, each electrically connected to the first, second, third, and fourth slider pads, respectively;
       first, second, third, and fourth connection circuit traces, each connected to the first, second, third, and fourth connection circuit pads, respectively; and
       a circuit surface, on which the first, second, third, and fourth connection circuit traces are interleaved such that the first connection circuit trace is adjacent to the second connection circuit trace, the second connection circuit trace is adjacent to the third connection circuit trace, and the third connection circuit trace is adjacent to the fourth connection circuit trace.

11. The assembly of claim 10, wherein a substantial portion of each of the first, second, third, and fourth connection circuit traces are substantially parallel on the circuit surface.

12. The assembly of claim 11, wherein the first, second, third, and fourth connection circuit pads are located on the circuit surface.

13. The assembly of claim 10, wherein the first connection circuit trace is shorted with the third connection circuit trace at two locations and the second connection circuit trace is shorted with the fourth connection circuit trace at two locations.

14. The assembly of claim 10, wherein the first, second, third, and fourth slider pads are connected by solder to the first, second, third, and fourth connection circuit pads, respectively.

15. The assembly of claim 10, wherein the first, second, third, and fourth slider pads are aligned substantially opposite of the first, second, third, and fourth connection circuit pads, respectively.

16. The assembly of claim 10, wherein an insulating layer is adjacent to each of the first and second slider traces on a side opposite the slider.

17. The assembly of claim 10, and further comprising:
    a transducing head supported by the slider and comprising:
       a positive terminal electrically connected to the first slider pad; and
       a negative terminal electrically connected to the second slider pad.

18. The assembly of claim 10, wherein the first, second, third, and fourth connection circuit traces are interleaved such that a substantial portion of the first connection circuit trace is adjacent to a substantial portion of the second connection circuit trace, the substantial portion of the second connection circuit trace is adjacent to a substantial portion of the third connection circuit trace, and the substantial portion of the third connection circuit trace is adjacent to a substantial portion of the fourth connection circuit trace.

* * * * *